United States Patent
Inoue et al.

(10) Patent No.: US 9,624,058 B2
(45) Date of Patent: Apr. 18, 2017

(54) SHEET CONVEYANCE APPARATUS AND IMAGE FORMING APPARATUS

(71) Applicant: BROTHER KOGYO KABUSHIKI KAISHA, Nagoya-shi, Aichi-ken (JP)

(72) Inventors: Masafumi Inoue, Tajimi (JP); Takashi Suzuki, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/671,068

(22) Filed: Mar. 27, 2015

(65) Prior Publication Data
US 2015/0274466 A1 Oct. 1, 2015

(30) Foreign Application Priority Data
Mar. 31, 2014 (JP) .................................. 2014-074714

(51) Int. Cl.
*B65H 7/02* (2006.01)
*B65H 7/06* (2006.01)
(Continued)

(52) U.S. Cl.
CPC ................. *B65H 7/06* (2013.01); *B65H 7/14* (2013.01); *B65H 7/20* (2013.01); *G06K 15/4025* (2013.01);
(Continued)

(58) Field of Classification Search
CPC ........ B65H 3/06; B65H 3/0684; B65H 5/068; B65H 7/00; B65H 7/02; B65H 7/06; B65H 7/08; B65H 7/14; B65H 7/20; B65H 2513/50; B65H 2513/511; B65H 2513/514; B65H 2513/53; B65H 2511/52
See application file for complete search history.

(56) References Cited

U.S. PATENT DOCUMENTS 5,253,855 A * 10/1993 Torisawa ................. B65H 5/26
271/107
5,667,215 A 9/1997 Yoshino
(Continued)

FOREIGN PATENT DOCUMENTS

JP 60-26539 A 2/1985
JP H0885671 A 4/1996
(Continued)

OTHER PUBLICATIONS

Notice of Reasons for Rejection of corresponding Japanese Patent Application No. 2014-074714, mailed Dec. 6, 2016.

*Primary Examiner* — Prasad Gokhale
(74) *Attorney, Agent, or Firm* — Merchant & Gould P.C.

(57) ABSTRACT

There is provided a sheet conveyance apparatus including: a loader unit loading sheets, a feeding unit feeding the sheets from the loader unit, a separating unit separating and conveying the sheets one by one, a detecting unit detecting the sheets, and a controller. The controller is configured to: measure a time from instructing the feeding unit for operation of feeding one of the sheets to the detecting unit detecting that sheet, and determine that there is a decrease in a capability of the feeding unit or the separating unit in a case that the measured time does not fit into a time needed to convey the sheet from a position of starting a normal operation of feeding the sheet to the position of the detecting unit.

11 Claims, 12 Drawing Sheets

(51) Int. Cl.
  *G06K 15/00* (2006.01)
  *B65H 7/14* (2006.01)
  *B65H 7/20* (2006.01)
  *B65H 3/06* (2006.01)

(52) U.S. Cl.
  CPC ...... *B65H 3/0684* (2013.01); *B65H 2511/511* (2013.01); *B65H 2511/514* (2013.01); *B65H 2511/52* (2013.01); *B65H 2513/50* (2013.01)

(56) References Cited

U.S. PATENT DOCUMENTS

| | | |
|---|---|---|
| 6,427,054 B1 | 7/2002 | Ohkubo et al. |
| 6,508,465 B1 * | 1/2003 | Endo ........................ B65H 3/06 271/265.01 |
| 2004/0195757 A1 * | 10/2004 | Lyu ........................ B65H 1/12 271/110 |
| 2004/0245701 A1 * | 12/2004 | Rhoads ................ B65H 3/0669 271/110 |
| 2007/0001388 A1 * | 1/2007 | Able ........................ B65H 7/08 271/258.01 |
| 2007/0063415 A1 * | 3/2007 | Elliott ...................... B65H 5/34 271/10.01 |
| 2010/0001455 A1 | 1/2010 | Miwa et al. |

FOREIGN PATENT DOCUMENTS

| | | |
|---|---|---|
| JP | H10247012 A | 9/1998 |
| JP | 2002-154681 A | 5/2002 |
| JP | 2008-222345 A | 9/2008 |
| JP | 2010013199 A | 1/2010 |
| JP | 2002006616 A | 1/2012 |
| JP | 2012071916 A | 4/2012 |

* cited by examiner

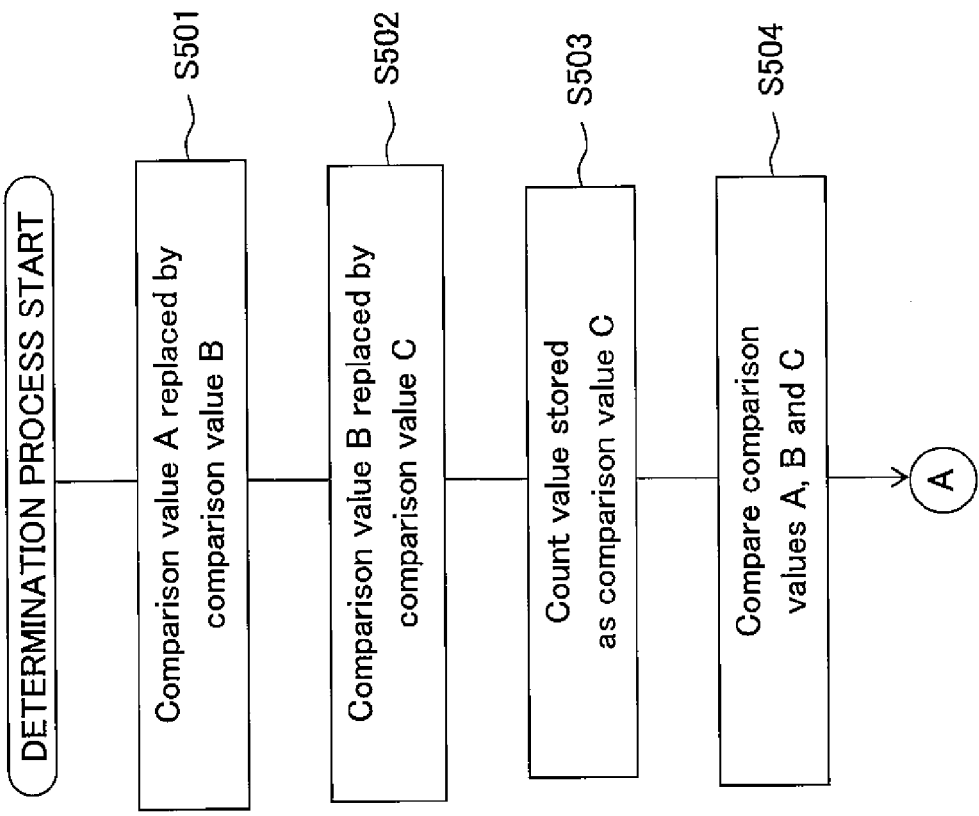

Fig. 9

| COMPARISON 1 | COMPARISON 2 | COMPARISON 3 | CASE |
|---|---|---|---|
| A < B | B < C | A < C | 1 |
| A < B | B = C | A < C | 3 |
| A < B | B > C | A < C | 3 |
| A < B | B > C | A = C | 3 |
| A < B | B > C | A > C | 3 |
| A = B | B < C | A < C | 2 |
| A = B | B = C | A = C | 3 |
| A = B | B > C | A > C | 3 |
| A > B | B < C | A < C | 2 |
| A > B | B < C | A = C | 3 |
| A > B | B < C | A > C | 3 |
| A > B | B = C | A > C | 3 |
| A > B | B > C | A > C | 3 |

SHEET CONVEYANCE APPARATUS AND IMAGE FORMING APPARATUS

CROSS REFERENCE TO RELATED APPLICATION

The present application claims priority from Japanese Patent Application No. 2014-074714, filed on Mar. 31, 2014, the disclosure of which is incorporated herein by reference in its entirety.

BACKGROUND

Field of the Invention

The present teaching relates to sheet conveyance apparatuses and image forming apparatuses.

Description of the Related Art

Some types of image forming apparatuses including a sheet conveyance apparatus are configured to determine the lifetime of feed rollers. For example, such image forming apparatuses are known that a first sensor and a second sensor are provided on the downstream side from a feed roller according to a sheet conveyance direction, so as to determine the lifetime of the feed roller based on the number of times or frequency of a set value to be exceeded by a time span from the first sensor detecting a sheet to the second sensor detecting the sheet.

SUMMARY

However, in the above configuration, two sensors are needed, that is, the first sensor and the second sensor. Further, while it is possible to determine whether or not the feed roller undergoes a decrease in conveyance capability due to abrasion, it is not possible to determine whether or not the feed roller undergoes a decrease in separation capability and/or in paper feed capability.

Accordingly, it is an object of the present teaching to provide a sheet conveyance apparatus and an image forming apparatus which are configured to determine with high precision whether or not there is a decrease in the capability of a feeding unit or of a separating unit.

According to a first aspect of the present teaching, there is provided a sheet conveyance apparatus configured to convey sheets, including:

a loader unit configured to accommodate the sheets thereon in a state that the sheets are stacked in a thickness direction of the sheets;

a feeding unit configured to contact with a sheet among the sheets located on the loader unit to feed the sheet from the loader unit;

a separating unit provided on a downstream side of the feeding unit in a conveyance direction of the sheet to separate and convey one by one the sheets fed by the feeding unit;

a detecting unit provided on the downstream side of the separating unit in the conveyance direction to detect the sheet; and a controller configured to:

measure a time elapsed since the controller has instructed the feeding unit to execute an operation for feeding the sheet until the detecting unit detects the sheet, and determine that there is a decrease in a capability of the feeding unit or the separating unit in a case that the measured time does not fit into a time needed to convey the sheet from a position of starting a normal operation of feeding the sheet to the position of the detecting unit.

According to the above configuration, it is possible to determine that there is a decrease in a capability of the feeding unit or the separating unit in a case that the time measured in the measuring process does not fit into a time needed to convey the sheet from a position of starting a normal operation of feeding the sheet to the position of the detecting unit.

BRIEF DESCRIPTION OF THE DRAWINGS

FIGS. 8A and 8B are flowcharts depicting a flow of determination process;

FIG. 9 depicts contents of a comparison table used in the determination process.

DESCRIPTION OF THE EMBODIMENT

Hereinbelow, referring to the accompanying drawings, an embodiment of the present teaching will be explained in detail.

<Mechanical Configuration>

Figure 1:
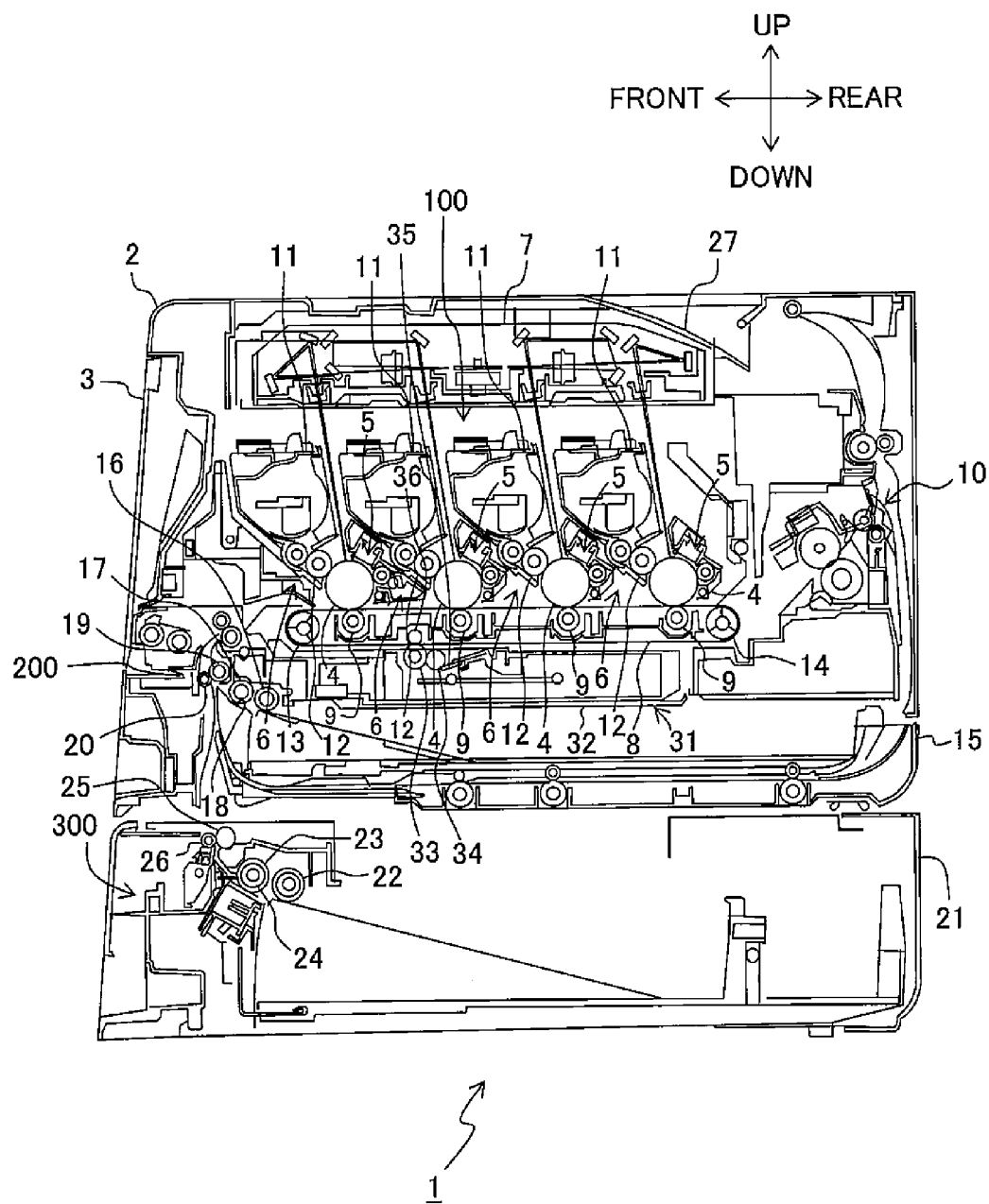
FIG. 1 is a cross-sectional view of a central part of a color printer adopting a sheet conveyance apparatus.

As depicted in FIG. 1, as one example of sheet conveyance apparatus and image forming apparatus, a color printer 1 includes a body casing 2. A front cover 3 is provided to be openable and closable at the front side of the body casing 2.

Further, the side in which the front cover 3 is provided (the left side in FIG. 1) is defined as the front side (front-face side) of the color printer 1. Further, the upper, lower, left, and right side of the color printer 1 are based on viewing the color printer 1 from the front side.

An image forming unit 100 is provided in the body casing 2. The image forming unit 100 includes four photoconductive drums 4, four charging devices 5, four developing devices 6, an exposure device 7, a sheet conveyance belt 8, four transfer rollers 9, and a fixing device 10.

The four photoconductive drums 4 are provided for the respective colors of black (K), yellow (Y), magenta (M) and cyan (C), and arranged in parallel at regular intervals in a front-rear direction in the order of black, yellow, magenta and cyan from the front side.

The four charging devices 5 are provided to correspond respectively to the photoconductive drums 4, and arranged above and in back of the corresponding photoconductive drums 4.

The four developing devices 6 are provided to correspond respectively to the photoconductive drums 4, and arranged above and in front of the corresponding photoconductive drums 4. Each of the developing devices 6 includes a developing case 11 containing a toner, and a developing roller 12 held by the developing case 11.

The exposure device 7 is arranged above the four photoconductive drums 4 at the uppermost part in the body casing 2. The exposure device 7 radiates four laser beams corresponding to the respective colors.

In forming images, the photoconductive drums 4 are rotated counterclockwise as viewed from the right side. That is, the photoconductive drums 4 are rotated counterclockwise according to FIG. 1. Along with the rotation of the photoconductive drums 4, the surfaces of the photoconductive drums 4 are exposed selectively to the laser beams from the exposure device 7 after being uniformly charged by electrical discharge of the charging device 5. Due to this exposure, electrical charge is selectively removed from the surfaces of the photoconductive drums 4 so as to form an electrostatic latent image on the surfaces of the photoconductive drums 4. The electrostatic latent image is developed into a toner image by being supplied with the toners from the developing rollers 12 of the developing devices 6.

The sheet conveyance belt 8 is arranged below the four photoconductive drums 4. The sheet conveyance belt 8 is an endless belt fastened on and around two rollers 13 and 14. The two rollers 13 and 14 are arranged at the same position or height according to an up-down direction, and arranged at an interval according to the front-rear direction. By virtue of this, the sheet conveyance belt 8 has a vertical planar portion extending between the two rollers 13 and 14 in the front-rear direction and in a left-right direction. The upper planar portion contacts with the respective surfaces (circumferential surfaces) of the four photoconductive drums 4.

The four transfer rollers 9 are arranged in positions facing the photoconductive drums 4, respectively, across the upper planar portion of the sheet conveyance belt 8.

The fixing device 10 is arranged in back of the sheet conveyance belt 8.

On the bottom of the body casing 2, a main paper feed cassette 15 is arranged to be loadable with sheets S (see FIG. 3) in a stacked state. A conveyance unit 200 is provided above the front end of the main paper feed cassette 15 as one example of the loader unit. The conveyance unit 200 includes a paper feed roller 16 as one example of the feeding unit, a separation roller 17 as one example of the separating unit, a separation pad 18 as other one example of the separating unit, and a pair of conveyance rollers 19 and 20.

The paper feed roller 16 is provided to be rotatable about a rotation axis extending in the left-right direction. The surface of the paper feed roller 16 contacts with an anterior end part of the sheets S located on the main paper feed cassette 15.

The separation roller 17 and the separation pad 18 are arranged in front of the paper feed roller 16. The separation roller 17 is provided to be rotatable about another rotation axis extending in the left-right direction. The surface of the separation roller 17 contacts with the separation pad 18 from above and back.

The pair of conveyance rollers 19 and 20 are arranged above and in front of the separation roller 17. The surfaces of the conveyance rollers 19 and 20 contact with each other.

Below the main paper feed cassette 15, an additional paper feed cassette 21 is arranged to be loadable with sheets S in a stacked state. An additional conveyance unit 300 is provided above a front end portion of the additional paper feed cassette 21 as other one example of the loader unit. The additional conveyance unit 300 includes a paper feed roller 22 as other one example of the feeding unit, a separation roller 23 as other one example of the separating unit, a separation pad 24 as still other one example of the separating unit, and a pair of conveyance rollers 25 and 26.

The paper feed roller 22 is provided to be rotatable about still another rotation axis extending in the left-right direction. The surface of the paper feed roller 22 contacts with an anterior end part of the sheets S located on the additional paper feed cassette 21.

The separation roller 23 and the separation pad 24 are arranged in front of the paper feed roller 22. The separation roller 23 is provided to be rotatable about still another rotation axis extending in the left-right direction. The surface of the separation roller 23 contacts with the separation pad 24 from above and back.

The pair of conveyance rollers 25 and 26 are arranged above and in front of the separation roller 23. The surfaces of the conveyance rollers 25 and 26 contact with each other.

In forming images, the sheets S are sent out from the main paper feed cassette 15 or additional paper feed cassette 21.

The sheets S located on the main paper feed cassette 15 are sent out from the main paper feed cassette 15 through the rotation of the paper feed roller 16 of the conveyance unit 200. The sheets S sent out from the main paper feed cassette 15 pass through the part between the separation roller 17 and the separation pad 18 and, at this time, are separated one from another. Any sheet S past the part between the separation roller 17 and the separation pad 18 is nipped between the pair of conveyance rollers 19 and 20 to be conveyed onto the sheet conveyance belt 8.

The sheets S located on the additional paper feed cassette 21 are sent out from the additional paper feed cassette 21 through the rotation of the paper feed roller 22 of the additional conveyance unit 300. The sheets S sent out from the additional paper feed cassette 21 pass through the part between the separation roller 23 and the separation pad 24 and, at this time, are separated one from another. Any sheet S past the part between the separation roller 23 and the separation pad 24 is nipped between the pair of conveyance rollers 25 and 26 to be conveyed toward the part between the pair of conveyance rollers 19 and 20 of the conveyance unit 200. Then, the sheet S is nipped between the pair of conveyance rollers 19 and 20 to be conveyed onto the sheet conveyance belt 8.

In forming images, the sheet conveyance belt 8 circulates clockwise as viewed from the right side. That is, the sheet conveyance belt 8 circulates clockwise according to FIG. 1. The sheet S sent in on the sheet conveyance belt 8 moves integrally with the upper planar portion of the sheet conveyance belt 8 and passes through the part between each photoconductive drum 4 and the sheet conveyance belt 8 sequentially. The transfer rollers 9 are supplied with a transfer bias. When forming a black-and-white image on the sheet S, a toner image is formed on the surface of the black photoconductive drum 4. Then, that toner image is transferred to the sheet S conveyed by the sheet conveyance belt 8 due to the effect of the transfer bias. By virtue of this, a black-and-white image is formed on the sheet S from the black toner image. Further, when forming a color image on the sheet S, toner images are formed on the surfaces of at least two of the photoconductive drums 4. Then, those toner images are superimposed on each other and transferred to the sheet S conveyed by the sheet conveyance belt 8 due to the effect of the transfer bias. By virtue of this, the color image is formed on the sheet S from superimposed toner images in multiple colors. The sheet S, to which the toner images are transferred, is conveyed to the fixing device 10. The fixing device 10 fixes the toner images on the sheet S by application of heat and pressure. The sheet S with the fixed toner images is discharged by various rollers to a paper discharge tray 27 as one example the paper discharge unit over the upper surface of the body casing 2.

A belt cleaner unit 31 is arranged between the sheet conveyance belt 8 and the main paper feed cassette 15. The belt cleaner unit 31 includes a unit case 32, a first cleaning roller 33, a second cleaning roller 34, and a scraper 35. The extraneous matters are removed from the sheet conveyance belt 8 by the first cleaning roller 33 and the second cleaning roller 34, and are stored in the unit case 32.

<Primary Configuration>

Figure 2:
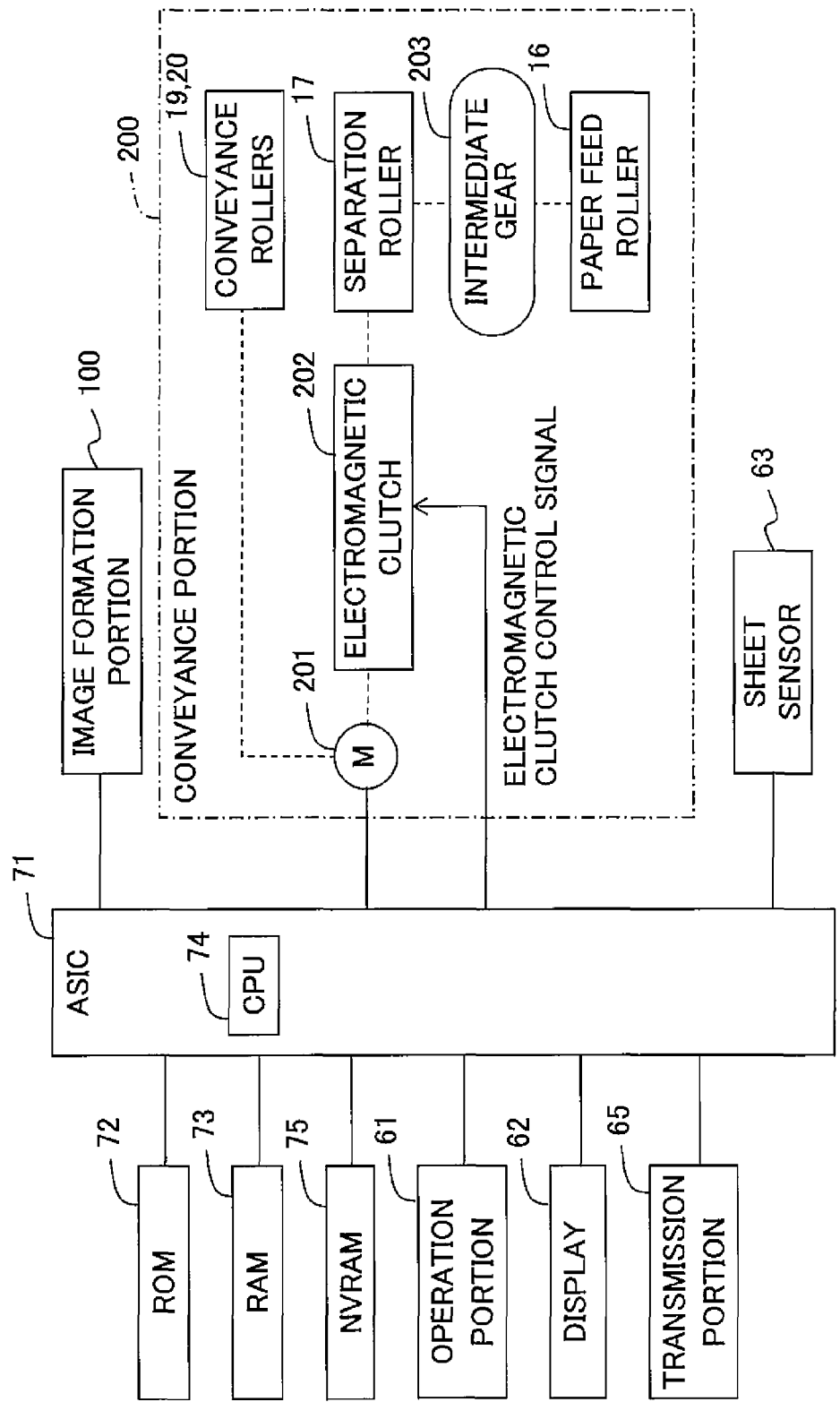
FIG. 2 is a block diagram depicting an electrical configuration of the color printer.

The color printer 1 includes, as depicted in FIG. 2, an operation unit 61, a display 62, a transmission unit 65, and a sheet sensor 63 as one example of the detecting unit.

The operation unit 61 is made from various buttons. Various inputs are made possible by pressing manual operation buttons of the operation unit 61. The manual operation buttons include, for example, a 'GO' button used to input an instruction to start an image formation, a cancel button used to input an instruction to cancel an image formation, etc.

The display 62 is made of, for example, a liquid crystal display device. Various kinds of information are displayed on the display 62.

The transmission unit 65 is connected to an information processing terminal such as a personal computer or the like.

Figure 3:
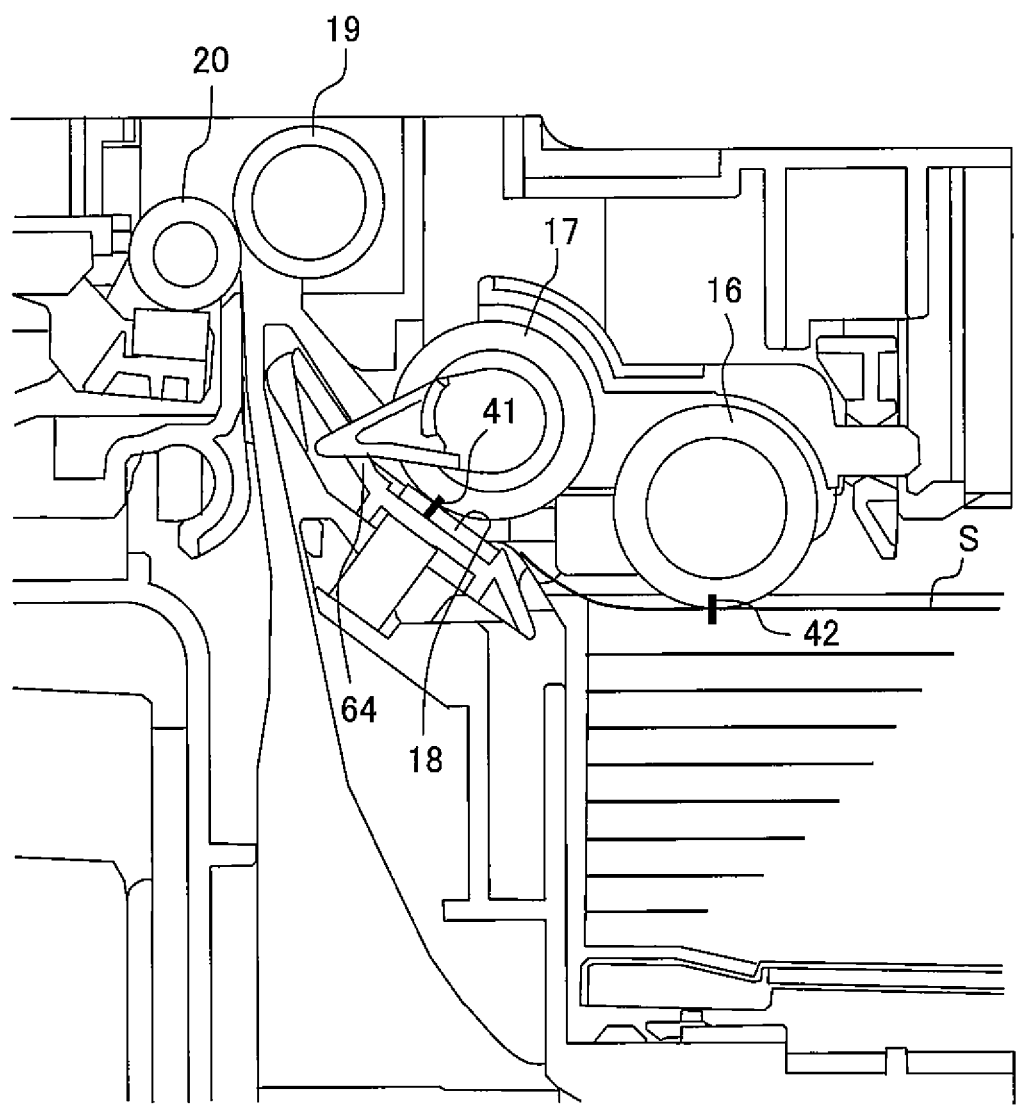
FIG. 3 is a cross-sectional view for explaining a configuration of a sheet sensor, depicting a paper feed capability and a separation capability in a normal state.

The sheet sensor 63 detects the passage of the sheets S conveyed by the conveyance unit 200, and outputs a detection signal (an ON signal, for example). In particular, the sheet sensor 63 includes, as shown in FIG. 3, an actuator 64. The actuator 64 is provided to be swingable about a swinging axis in conformity with the rotation axis of the separation roller 17, and to extend from the swinging axis to the front of the separation roller 17. The sheet S past a contact portion (to be referred to below as "separation nip point 41") between the separation roller 17 and the separation pad 18 comes to contact with the actuator 64 and, thereafter, when the sheet S is further conveyed, then the actuator 64 is raised by the sheet S. When the actuator 64 is raised, then the detection signal is output from the sheet sensor 63. The separation nip point 41 is one example of the separative position.

Further, the color printer 1 includes an ASIC (Application Specific Integrated Circuit) 71, a ROM 72, a RAM 73, and an NVRAM (Non Volatile RAM) 75.

The ASIC 71 incorporates a CPU 74. Such signals are input to the ASIC 71: an operation signal indicating that a manual operation button of the operation unit 61 was pressed, the detection signal of the sheet sensor 63, etc. Based on the information inputted to the ASIC 71, the CPU 74 as one example of the controller controls the operations of the image forming unit 100 and the conveyance unit 200 by carrying out programs for various processes.

The ROM 72 stores the programs to be executed by the CPU 74, various data, and the like.

The NVRAM 75, as one example of the storage unit, and the RAM 73 are used as work areas for the CPU 74 to execute the programs.

The conveyance unit 200 includes a drive motor 201, an electromagnetic clutch 202, and an intermediate gear 203. The drive force produced by the drive motor 201 is transmitted to one of the conveyance rollers 19 and 20. Further, the drive force of the drive motor 201 is transmitted to the separation roller 17 via the electromagnetic clutch 202. With the electromagnetic clutch 202 turned on, the drive force of the drive motor 201 is transmitted to the separation roller 17, whereas with the electromagnetic clutch 202 turned off, the drive force is blocked from being transmitted to the separation roller 17. The drive force transmitted to the separation roller 17 is transmitted on to the paper feed roller 16 via the intermediate gear 203. By virtue of this, when the separation roller 17 rotates, the paper feed roller 16 also rotates, whereas when the separation roller 17 stops, the paper feed roller 16 also stops. The CPU 74 controls ON/OFF of the drive motor 201 to control ON/OFF of the electromagnetic clutch 202 by turning on/off an electromagnetic clutch control signal.

<Control Process>

Figure 4A:
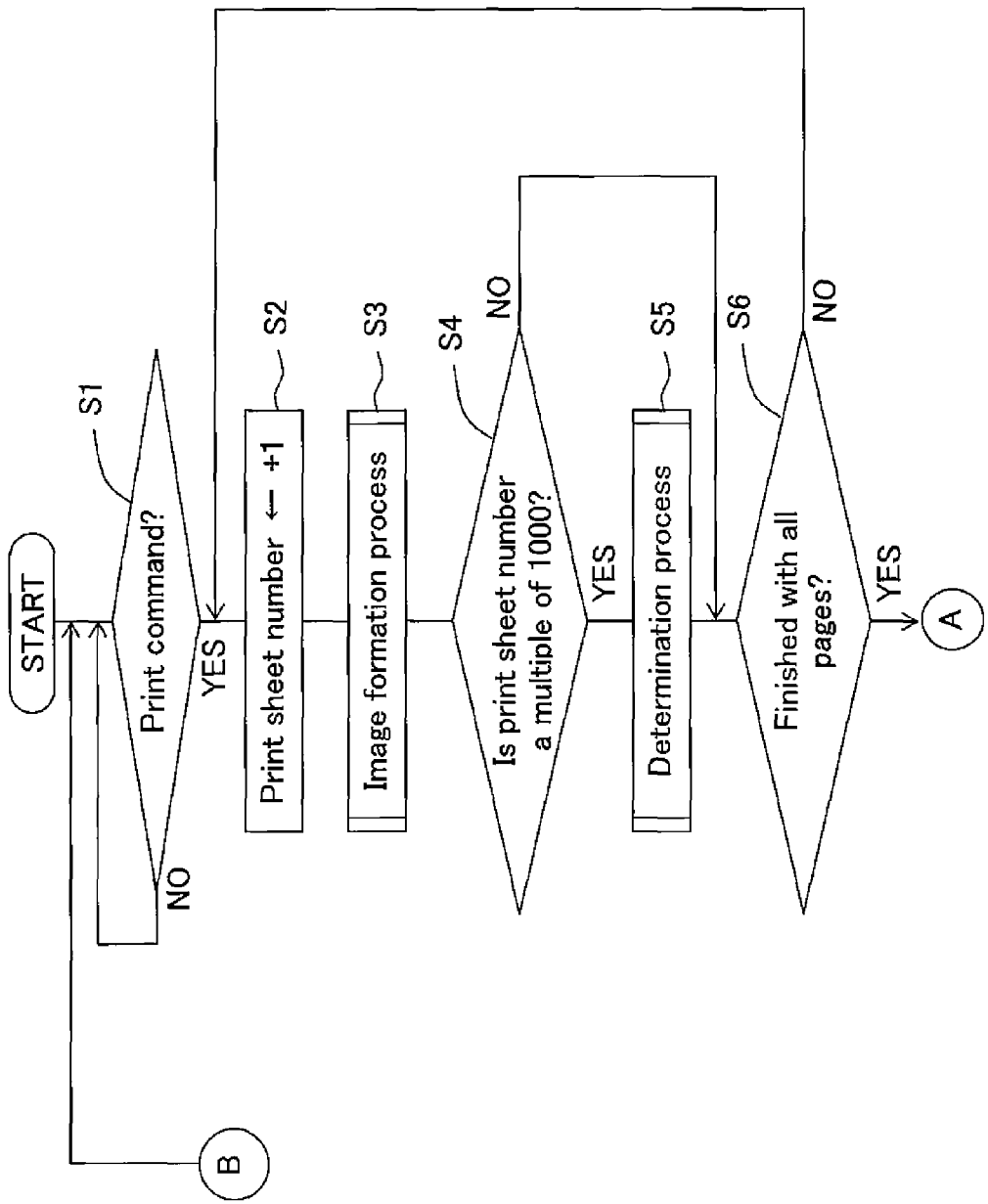
FIGS. 4A and 4B are flowcharts depicting a flow of control process.
Figure 4B:
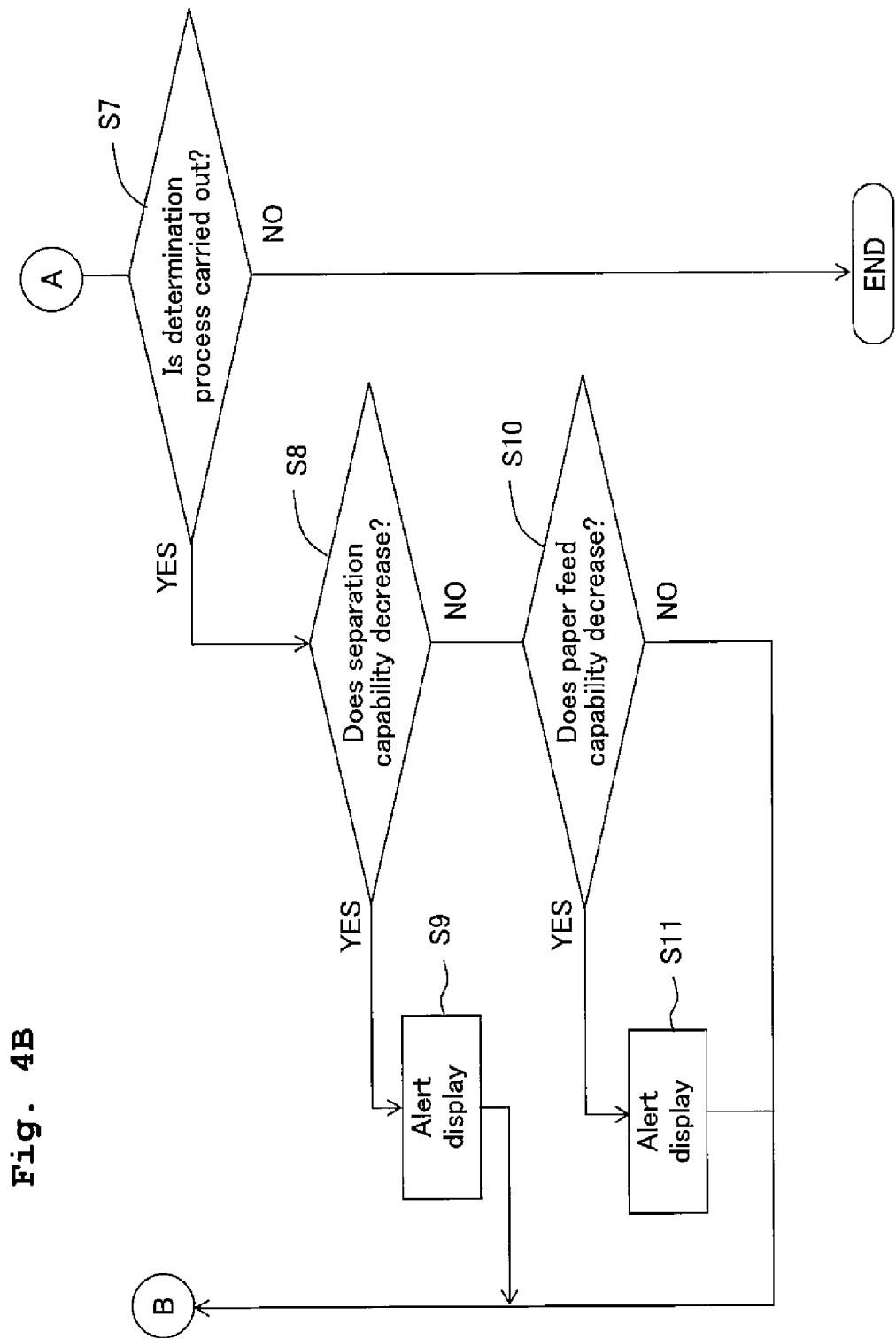

When the color printer 1 is powered on, the CPU 74 of the ASIC 71 repetitively carries out a control process shown in FIG. 4.

In the control process, the CPU 74 determines whether or not a print command has been input (step S1, to be simply referred to below as S1). The print command is inputted together with image data from an unshown PC via a LAN (Local Area Network), for example.

When no print command is input (S1: No), then the CPU 74 lets the following control process stand by until a print command is input.

When a print command is input (S1: Yes), then the CPU 74 increments the value of a print sheet counter (S2). The print sheet counter is provided in the NVRAM 75 to count the number (print sheet number) of the sheets S on which images are formed by the image forming unit 100.

After incrementing the value of the print sheet counter, the CPU 74 controls the image forming unit 100 and the conveyance unit 200 to carry out an image formation process for forming image on one of the sheets S (S3). The image formation process will be described later.

After the image formation process, the CPU 74 determines whether or not the value of the print sheet counter, i.e., the printed sheets, is a multiple of 1000 (S4).

When the value of the print sheet counter is a multiple of 1000 (S4: Yes), then the CPU 74 carries out a determination process to determine whether or not the there is a decrease in the conveyance capability of the conveyance unit 200 (S5). By virtue of this, letting formation of images on 1000 sheets S be one unit, the determination process is carried out according to each one unit. The determination process will be described later.

After the determination process, the CPU 74 determines whether or not image formation is finished with all pages for the image data input together with the print command (S6).

When the value of the print sheet counter is not a multiple of 1000 (S4: No), then the CPU 74 does not carry out the determination process (S5: Skip), but determines whether or not image formation is finished with all pages for the image data input together with the print command (S6).

When image formation is not finished with all pages (S6: No), then after incrementing the value of the print sheet counter (S2), the CPU 74 carries out the image formation process over again (S3). By virtue of this, the process of steps S2 to S6 is repeated until image formation is finished with all pages.

When image formation is finished with all pages (S6: Yes), then the CPU 74 determines whether or not the determination process has been carried out during a series of image formations according to the print command (S7).

When the determination process is not carried out (S7: No), then the CPU 74 ends the control process.

When the determination process has been carried out (S7: Yes), then the CPU 74 determines whether or not the determination process has determined a decrease in the separation capability (S8).

When a decrease in the separation capability has been determined (S8: Yes), then the CPU 74 displays an alert on the display unit 62 to the effect that there is a decrease in the separation capability (S9), and returns the process to the step S1.

When the determination process has not determined a decrease in the separation capability, then the CPU 74 determines whether or not the determination process has determined a decrease in the paper feed capability (S10).

When a decrease in the paper feed capability has been determined (S10: Yes), then the CPU 74 displays an alert on the display 62 to the effect that there is a decrease in the paper feed capability (S11), and returns the process to the step S1.

When the determination process has not determined decreases in the separation capability and in the paper feed capability (S10: No), then the CPU 74 does not display the alerts, but returns the process to the step S1.

<Image Formation Process>

Figure 5:
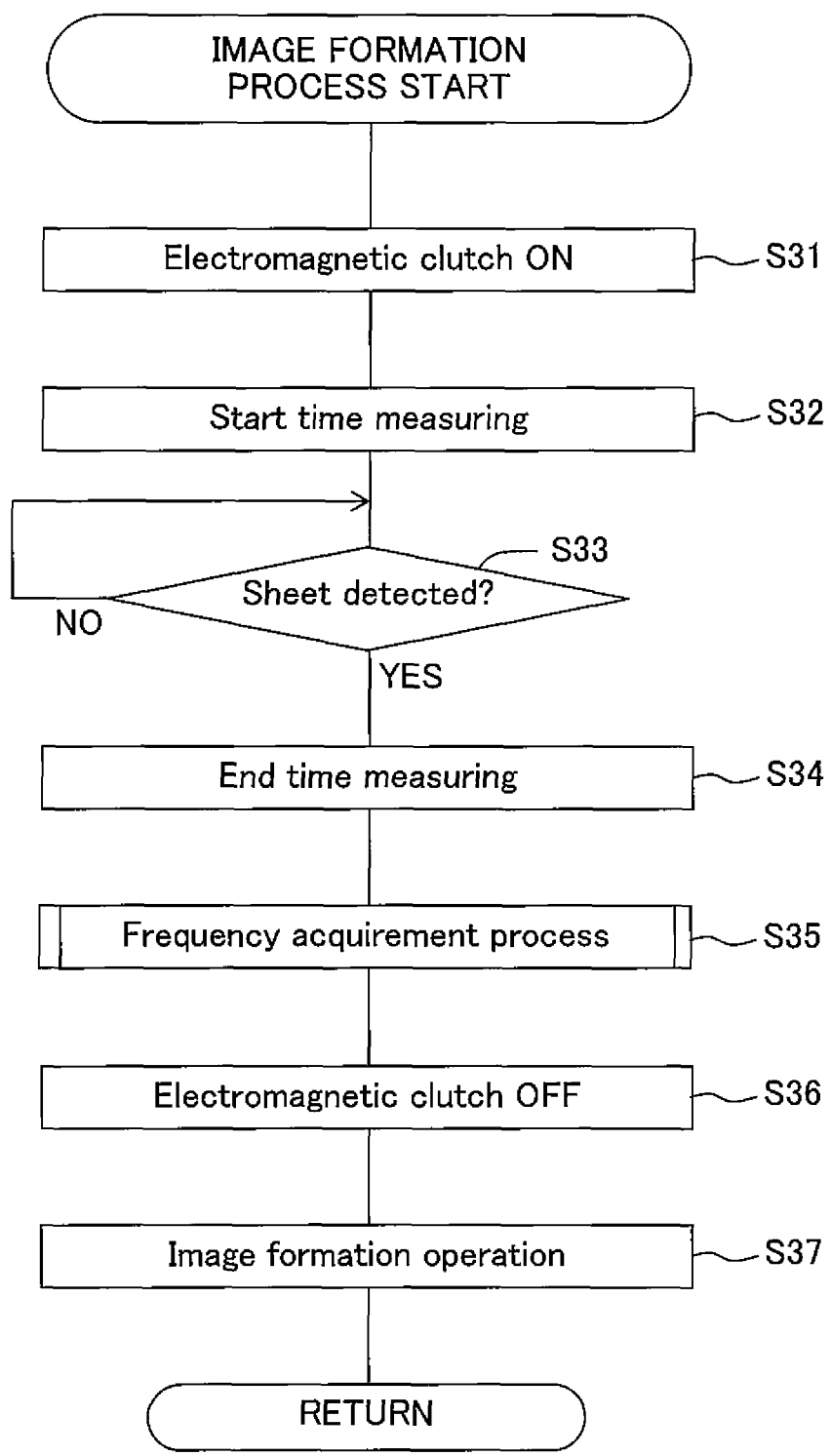
FIG. 5 is a flowchart depicting a flow of image forming process.

FIG. 5 depicts a flow of image formation process carried out in the step S3 in FIG. 4.

In the image formation process, the CPU 74 drives the drive motor 201. Further, the CPU 74 turns on the electromagnetic clutch control signal to turn on the electromagnetic clutch 202 (S31). When the electromagnetic clutch 202 is turned on, then the drive force of the drive motor 201 is transmitted to the paper feed roller 16 via the separation roller 17 to rotate the paper feed roller 16 and the separation roller 17. The rotation of the paper feed roller 16 causes the sheets S to be sent out from the main paper feed cassette 15.

Along with the input of the electromagnetic clutch control signal, the CPU 74 starts measuring a difference time Td with a timer (S32). The timer is built in the ASIC 71.

Thereafter, the CPU 74 monitors the state of the output signal of the sheet sensor 63 to determine whether or not the sheet sensor 63 has detected any sheet S (S33).

When the sheet sensor 63 has detected a sheet S (S33: Yes), then the CPU 74 ends measuring the difference time Td with the timer (S34).

Then, the CPU 74 carries out a position estimation process (S35). The position estimation process will be described later.

The CPU 74 turns off the electromagnetic clutch control signal to turn off the electromagnetic clutch 202 (S36). Further, the CPU 74 controls the image forming unit 100 to cause the image forming unit 100 to carry out an image formation operation (S37). An image is thus formed on one sheet S by the image formation operation. After the image formation operation is finished, the CPU 74 ends the image formation process.

<Position Estimation Process>

Figure 6:
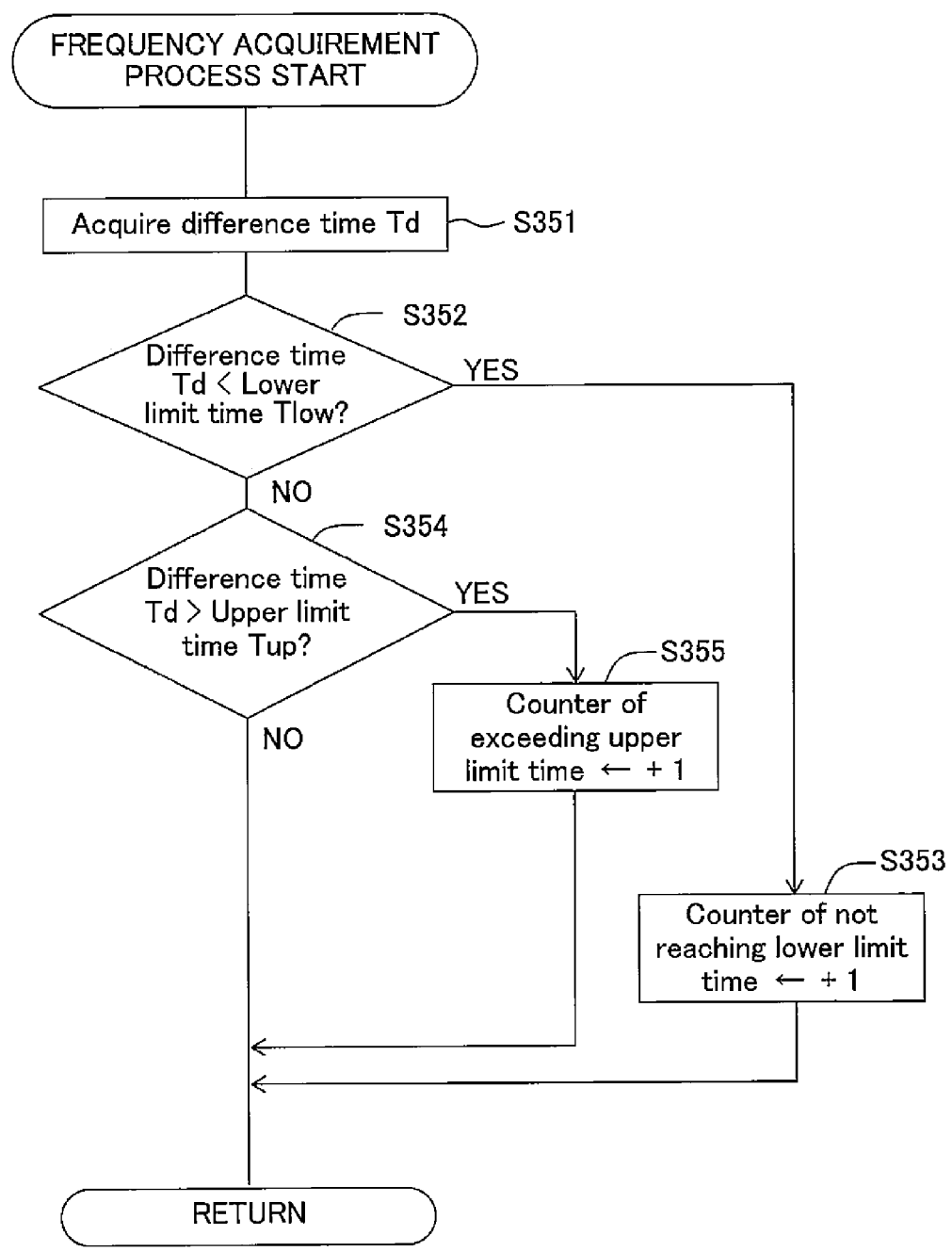
FIG. 6 is a flowchart depicting a flow of position estimation process.

FIG. 6 depicts a flow of position estimation process carried out in the step S35 in FIG. 5.

In the position estimation process, the CPU 74 acquires the difference time Td measured with the timer (S351). The difference time Td is the time from turning on the electromagnetic clutch control signal to the sheet sensor 63 detecting a sheet S.

After acquiring the difference time Td, the CPU 74 determines whether or not the difference time Td is less than a lower limit time Tlow (S352). The lower limit time Tlow is the time from the anterior end of a sheet S conveyed by the conveyance unit 200 having passed the separation nip point 41 to the sheet sensor 63 detecting the sheet S with the conveyance unit 200 in a normal state of conveyance capability. The lower limit time Tlow is measured by an experiment and stored in the ROM 72.

Figure 7:
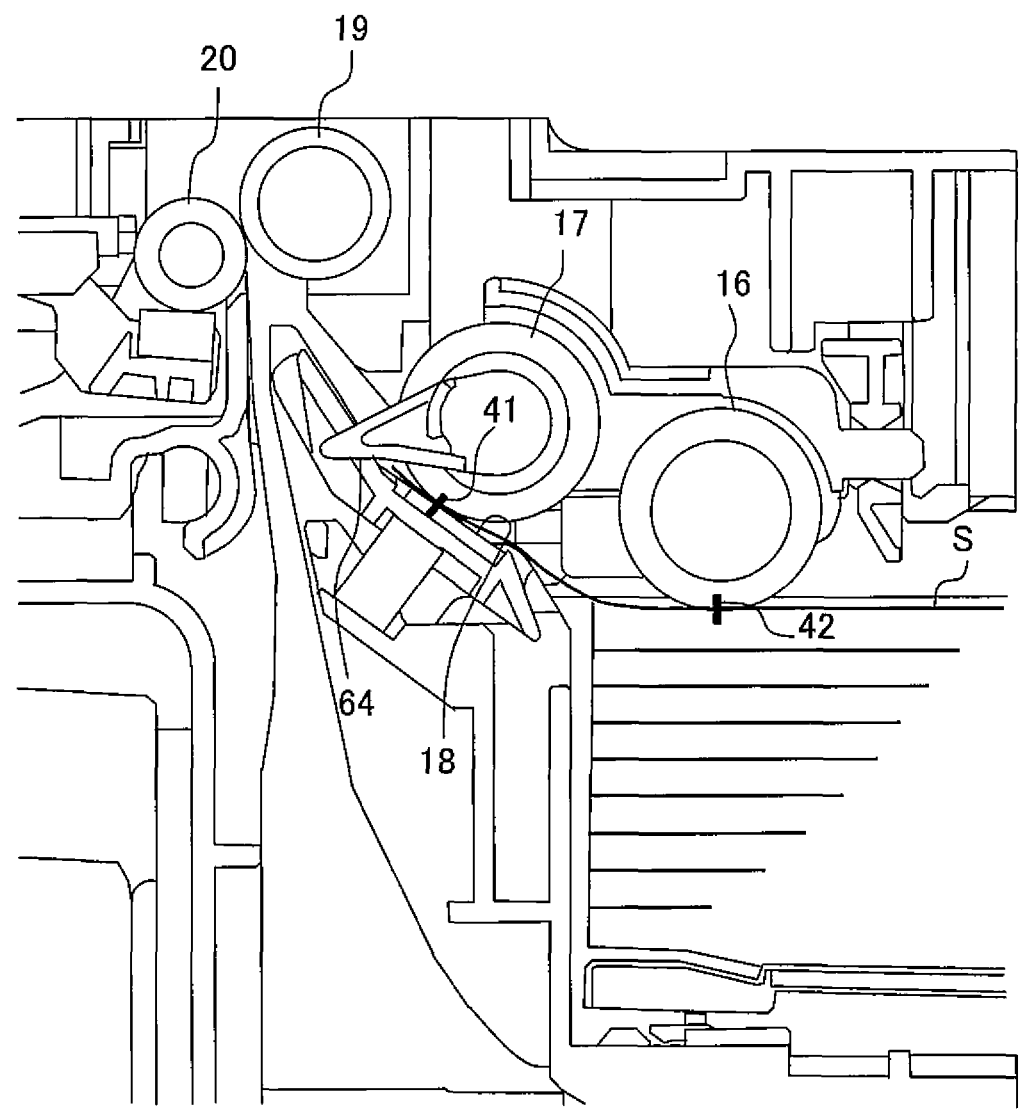
FIG. 7 is a cross-sectional view depicting that a sheet is positioned past a separation nip point.

When the difference time Td is less than the lower limit time Tlow, then as depicted in FIG. 7, at the time of starting rotation of the paper feed roller 16 (to be referred to below as "the time of starting the paper feed"), the anterior end of the sheet S is positioned past the separation nip point 41 to the side of detection position of the sheet sensor 63. Such a case is resulted from insufficient separation of the sheets S by the separation roller 17 and the separation pad 18 in the previous image formation. When the difference time Td is less than the lower limit time Tlow (S352: Yes), then the CPU 74 increments the value of a counter of not reaching lower limit time (S353), and ends the position estimation process. The counter of not reaching lower limit time is provided in the NVRAM 75 to count the number of times the measured time has fallen below the lower limit time.

When the difference time Td is not less than the lower limit time Tlow (S352: No), then the CPU 74 determines whether or not the difference time Td is more than an upper limit time Tup (S354). The upper limit time Tup is the time from the anterior end of a sheet S conveyed by the conveyance unit 200 being at a position 42 of the paper feed roller 16 to the sheet sensor 63 detecting the sheet S with the conveyance unit 200 in a normal state of conveyance capability. The upper limit time Tup is also measured by an experiment and stored in the ROM 72.

When the difference time Td is more than the upper limit time Tup, then it is estimated that because of an insufficient paper feed by the paper feed roller 16, the paper feed roller 16 has rotated in vain and thus fed no paper before the sheet S is sent out from the main paper feed cassette 15. When the difference time Td is more than the upper limit time Tup (S354: Yes), then the CPU 74 increments the value of a counter of exceeding upper limit time (S355), and ends the position estimation process. The counter of exceeding upper limit time is provided in the NVRAM 75 to count the number of times of exceeding the upper limit time.

When the difference time Td is not less than the lower limit time Tlow and not more than the upper limit time Tup (S354: No), then as depicted in FIG. 3, at the time of starting the paper feed, it is estimated that the anterior end of a sheet S is positioned between the position of the paper feed roller 16 and the separation nip point 41. Because this is a normal position, the CPU 74 does not increment any of the values of the counter of not reaching lower limit time and the counter of exceeding upper limit time, but ends the position estimation process.

<Determination Process>

Figure 8B:
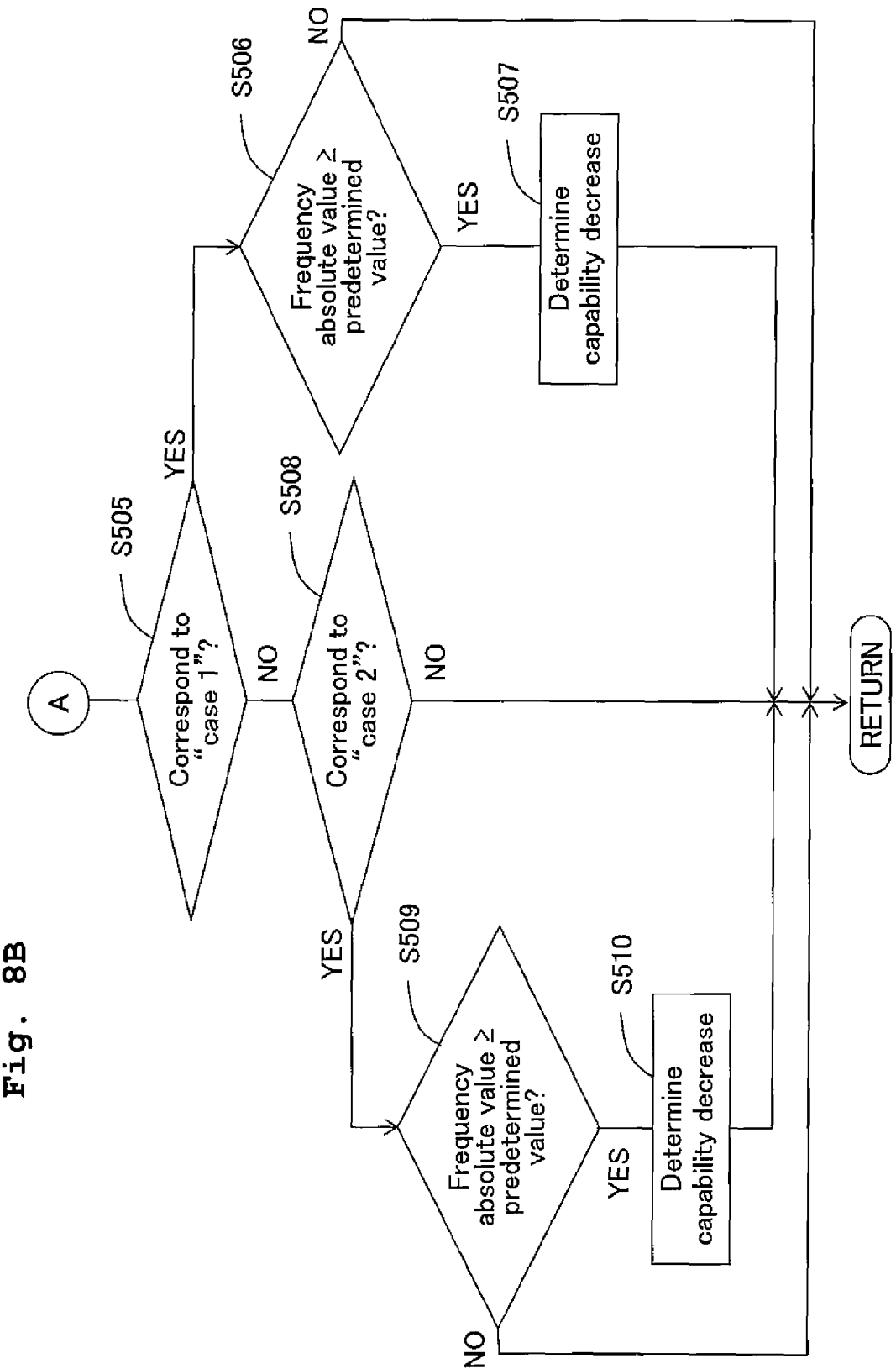

FIG. 8 depicts a flow of determination process carried out in the step S5 in FIG. 4.

The conveyance capability of the conveyance unit 200 includes the paper feed capability by the paper feed roller 16, and the separation capability by the separation roller 17 and the separation pad 18. The determination process includes both a determination process of determining whether or not there is a decrease in the paper feed capability and a determination process of determining whether or not there is a decrease in the separation capability. Both of the determination processes use common programs, and each of the determination processes is performed according to the flow depicted in FIG. 8.

First, an explanation will be made on the determination process of whether or not the paper feed capability decreases.

The determination process uses a comparison value A, a comparison value B, and a comparison value C. The comparison value A is the value of the counter of exceeding upper limit time two units earlier, the comparison value B is the value of the counter of exceeding upper limit time one unit earlier, and the comparison value C is the current value of the counter of exceeding upper limit time. The determination process is carried out with 1000 sheets as one unit. The comparison value A, the comparison value B, and the comparison value C are stored in the NVRAM 75.

When the CPU 74 starts the determination process, then first, the comparison value A is replaced by the comparison value B (S501). That is, the comparison value A is deleted, the comparison value B is stored as the comparison value A, and then the comparison value B is deleted.

Next, the CPU 74 replaces the comparison value C by the comparison value B (S502). That is, the comparison value C is stored as the comparison value B, and then the comparison value C is deleted.

Thereafter, the CPU 74 causes the current count value to be stored as the comparison value C (S503).

Then, the CPU 74 carries out a magnitude comparison between the comparison value A, the comparison value B, and the comparison value C (S504).

In the magnitude relation between the comparison value A and the comparison value B, there are three occasions: the comparison value A is smaller than the comparison value B (A<B), the comparison value A is equal to the comparison value B (A=B), and the comparison value A is larger than the comparison value B (A>B). In the magnitude relation between the comparison value B and the comparison value C, there are also three occasions: the comparison value B is smaller than the comparison value C (B<C), the comparison value B is equal to the comparison value C (B=C), and the comparison value B is larger than the comparison value C (B>C). In the magnitude relation between the comparison value A and the comparison value C, there are still three occasions: the comparison value A is smaller than the comparison value C (A<C), the comparison value A is equal to the comparison value C (A=C), and the comparison value A is larger than the comparison value C (A>C). Therefore, there are 13 occasions in total in the magnitude relation between the comparison value A, the comparison value B, and the comparison value C.

Figure 10A:
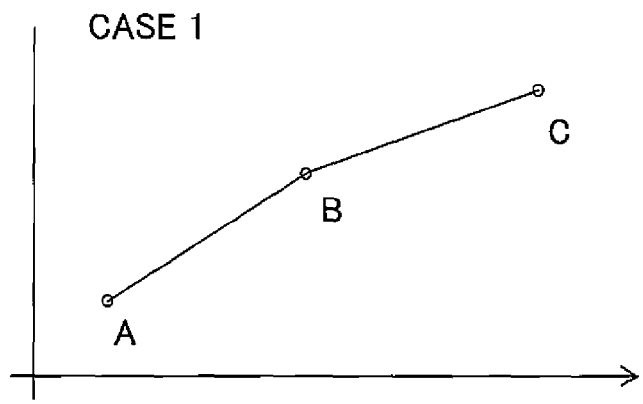
FIGS. 10A to 10C depict case 1, case 2, and case 3, respectively.
Figure 10B:
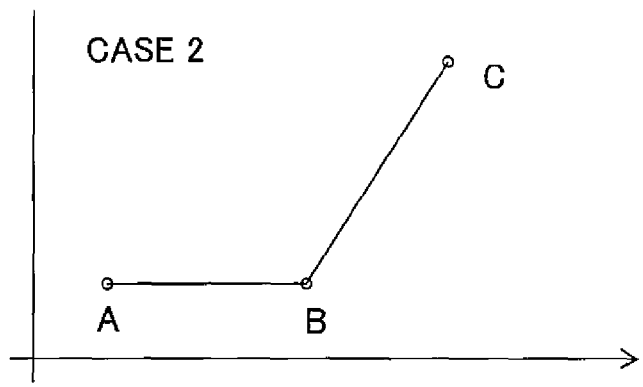
Figure 10C:
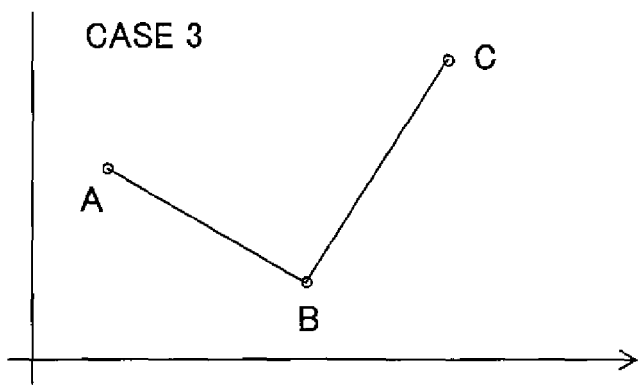

The ROM 72 stores a comparison table depicted in FIG. 9. The comparison table is created by classifying the 13 respective occasions of the magnitude relation into "case 1", "case 2", and "case 3". FIGS. 10A to 10C depict some examples of the "case 1", "case 2", and "case 3".

Other cases than the "case 1", "case 2", and "case 3" do not exist because contradiction will then arise in the magnitude relation between the comparison value A and the comparison value B, in the magnitude relation between the comparison value B and the comparison value C, and in the magnitude relation between the comparison value A and the comparison value C.

The "case 1" shown in FIG. 10A is a case of a monotonic increase in the order of the comparison value A, the comparison value B and the comparison value C, and thus is a magnitude relation with high possibility of a great decrease in the paper feed capability (the separation capability in determining whether or not there is a decrease in the separation capability).

The "case 2" depicted in FIG. 10B is a case of the comparison value C being larger than the comparison value A and the comparison value B, and thus is a magnitude relation with high possibility of a decrease in the paper feed capability (the separation capability in determining whether or not there is a decrease in the separation capability).

The "case 3" shown in FIG. 10C is a case other than the "case 1" and "case 2", and is a magnitude relation with no decrease in the paper feed capability (the separation capability in determining whether or not there is a decrease in the separation capability).

Referring to the comparison table, the CPU 74 determines whether or not the magnitude relation between the comparison value A, the comparison value B and the comparison value C falls into any of the "case 1", "case 2" and "case 3" (S505).

When the magnitude relation between the comparison value A, the comparison value B and the comparison value C falls into the "case 1" (S505: Yes), then the CPU 74 determines whether or not a predetermined value is not more than the absolute value of frequency for the position estimation process to determine that the difference time Td is more than the upper limit time Tup (S506). The process proceeds to the step S507 when the predetermined value is not more than the difference between the comparison value A and the comparison value B and the difference between the comparison value A and the comparison value C which are frequencies for determining more than the upper limit time Tup with every 1000 sheets.

Even though the magnitude relation falls into the "case 1", when the predetermined value is more than the difference between the comparison value A and the comparison value B or the difference between the comparison value A and the comparison value C (S506: No), for example, when there is almost no difference between the comparison value A and the comparison value B, then the CPU 74 determines that there is no decrease in the paper feed capability, and ends the determination process.

On the other hand, when the predetermined value is not more than the difference between the comparison value A and the comparison value B or the difference between the comparison value A and the comparison value C (S506: Yes), then the CPU 74 determines that there is a decrease in the paper feed capability (S507), and ends the determination process.

When the magnitude relation between the comparison value A, the comparison value B and the comparison value C does not fall into the "case 1" (S505: No), then the CPU 74 determines whether or not the magnitude relation falls into the "case 2" (S508).

When the magnitude relation between the comparison value A, the comparison value B and the comparison value C falls into the "case 2" (S508: Yes), then the CPU 74 determines whether or not the predetermined value is not more than the difference between the comparison value B and the comparison value C (S509).

Even though the magnitude relation falls into the "case 2", when the predetermined value is more than the difference between the comparison value B and the comparison value C (S509: No), then the CPU 74 determines that there is no decrease in the paper feed capability, and ends the determination process.

On the other hand, when the predetermined value is not more than the absolute value of the frequency (S509: Yes), then the CPU 74 determines that there is a decrease in the paper feed capability (S510), and ends the determination process.

When the magnitude relation between the comparison value A, the comparison value B and the comparison value C neither falls into the "case 1" nor falls into the "case 2" (S508: No), then the CPU 74 determines that there is no decrease in the paper feed capability, and ends the determination process.

Next, an explanation will be explained on the determination process of whether or not the separation capability decreases.

The determination process uses the comparison value A, the comparison value B, and the comparison value C. The comparison value A, the comparison value B, and the comparison value C are stored in the NVRAM 75. At the time of starting the determination process, as the comparison value A, the value of the counter of not reaching lower limit value is stored for every 1000 sheets at the time of carrying out the determination process two units earlier. Further, as the comparison value B, the value of the counter of not reaching lower limit value is stored for every 1000 sheets at the time of carrying out the determination process one unit earlier, and as the comparison value C, the value of the counter of not reaching lower limit value is stored for every 1000 sheets at the time of carrying out the determination process at the current time.

The flow after starting the determination process, and the contents of the determination process are identical to the case of the determination process of whether or not the paper feed capability decreases. Hence, the explanation therefor is omitted.

<Function and Effects>

In the above manner, when the measured time does not fit into the time needed to convey a sheet S from the position of starting the normal operation of feeding sheets, to the position of the sheet sensor 63, then it is possible to determine that there is a decrease in the capabilities of the paper feed rollers 16 and 22, and the separation rollers 17 and 23 or separation pads 18 and 24.

When the measured time is shorter than the lower limit time needed to convey a sheet S from the separation nip point 41 of the sheets S to the position of the sheet sensor 63, then the CPU 74 can determine that there is a decrease in the capabilities of the separation rollers 17 and 23 or separation pads 18 and 24.

When the measured time is longer than the upper limit time needed to convey a sheet S by the distance from the contact position 42 between the paper feed rollers 16 and 22 and the sheet S to the position of the sheet sensor 63, then the CPU 74 can determine that there is a decrease in the capabilities of the paper feed rollers 16 and 22.

The CPU 74 takes such a time as the measured time that is calculated by subtracting a start-up requiring time needed from instructing the paper feed rollers 16 and 22 for the operation of feeding the sheet S to the paper feed rollers 16 and 22 starting the feeding, from the time from instructing the paper feed rollers 16 and 22 for the operation of feeding the sheet S to the sheet sensor 63 detecting the sheet S.

There are cases that some time is needed from the CPU 74 instructing the paper feed rollers 16 and 22 for the operation of feeding the sheet S to the paper feed rollers 16 and 22 actually starting the feeding. In such cases, it is possible to eliminate any individual difference from each color printer 1 to another by considering the start-up requiring time beforehand to correct the measured time.

The NVRAM 75 stores, as the lower limit time, the start-up requiring time needed from instructing the paper feed rollers 16 and 22 for the operation of feeding the sheet S to the paper feed rollers 16 and 22 starting the feeding, to which is added the time needed to convey the sheet S from the separation nip point 41 of the sheets S to the position of the sheet sensor 63; and stores, as the upper limit time, the start-up requiring time to which is added the time needed to convey the sheet S by the distance from the contact position 42 between the paper feed rollers 16 and 22 and the sheet S to the position of the sheet sensor 63.

There are cases that some time is needed from the CPU 74 instructing the paper feed rollers 16 and 22 for the operation of feeding the sheet S to the paper feed rollers 16 and 22 actually starting the feeding. In such cases, it is possible to eliminate any individual difference from each color printer 1 to another by considering the start-up requiring time beforehand to predetermine the lower limit time and the upper limit time.

In a first case that the measured time is shorter than the lower limit time each time the paper feed rollers 16 and 22 are instructed for the operation of feeding the sheet S, and in a second case that the time measured in a measuring process is longer than the upper limit time, the CPU 74 acquires the number of occurrences of each of the above cases, and determines that there is a decrease in the capability of the separation rollers 17 and 23 or the separation pads 18 and 24 when a predetermined value is exceeded by a ratio of the number corresponding to the first case, acquired for the occurrences of instructing the paper feed rollers 16 and 22 for the operation of feeding the sheet S, but determines that there is a decrease in the capability of the paper feed rollers 16 and 22 when the predetermined value is exceeded by a ratio of the number corresponding to the second case, acquired for the occurrences of instructing the paper feed rollers 16 and 22 for the operation of feeding the sheet S.

When the measured time is only once longer than the upper limit time or shorter than the lower limit time, then it is conceivable that such a case is an incident, and it is possible to have no certainty about a decrease in the capability of the paper feed rollers 16 and 22, the separation rollers 17 and 23, or the separation pads 18 and 24. Therefore, the CPU 74 determines that there is a decrease in the capability of the paper feed rollers 16 and 22, the separation rollers 17 and 23 or the separation pads 18 and 24 when the predetermined value is exceeded by the ratio of the number acquired for the occurrences of instructing the paper feed rollers 16 and 22 for the operation of feeding the sheet S. Thus, it is possible to correctly determine whether or not there is a decrease in the capability of the paper feed rollers 16 and 22, the separation rollers 17 and 23 or the separation pads 18 and 24 in the color printer 1.

The CPU 74 finds a ratio of the number corresponding to the first case acquired for predetermined times of instructing the paper feed rollers 16 and 22 for the operation of feeding the sheet S, for example, during 1000 times for 1000 times each time 1000 times are reached, and a ratio of the number corresponding to the first case acquired during 1000 times for 1000 times, and determines whether or not there is a decrease in the capability of the separation rollers 17 and 23 or the separation pads 18 and 24 by the ratio of the first case found every 1000 times, but determines whether or not there is a decrease in the capability of the paper feed rollers 16 and 22 by the ratio of the second case found every 1000 times.

The CPU 74 determines whether or not there is a decrease in the capability of the paper feed rollers 16 and 22, the separation rollers 17 and 23, or the separation pads 18 and 24 for every predetermined times, for example, every 1000 times and, based on the determination results of plurality of times from every predetermined number of times, finally determines whether or not there is a decrease in the capability of the paper feed rollers 16 and 22, the separation rollers 17 and 23, or the separation pads 18 and 24. Hence, it is possible to determine the same more precisely.

The CPU 74 determines that there is a decrease in the capability of the separation rollers 17 and 23 or the separation pads 18 and 24 when the ratio of the first case, found from every predetermined number of times, for example, every 1000 times, is on the increase, but determines that there is no decrease in the capability of the separation rollers 17 and 23 or the separation pads 18 and 24 when the ratio of the first case, found from every predetermined number of times, is not on the increase. Further, the CPU 74 determines that there is a decrease in the capability of the paper feed rollers 16 and 22 when the ratio of the second case, found from every predetermined number of times, is on the increase, but determines that there is no decrease in the capability of the paper feed rollers 16 and 22 when the ratio of the second case, found from every predetermined number of times, is not on the increase.

The ratio is on the increase when there is a decrease in the capability of the paper feed rollers 16 and 22, the separation rollers 17 and 23 or the separation pads 18 and 24, but not on the increase when the cases are incidents. Therefore, it is possible to determine that there is a decrease in the capability of the paper feed rollers 16 and 22, the separation rollers 17 and 23 or the separation pads 18 and 24 when the determination result from every predetermined number of times is on the increase, but to determine that there is no decrease in the capability of the feeding unit or the separating unit when the ratio found from every predetermined number of times is not on the increase.

The CPU 74 determines that there is a decrease in the capability of the separation rollers 17 and 23 or the separation pads 18 and 24 when the ratio of the first case, found from every predetermined number of times, for example, every 1000 times, is on the increase, and when a predetermined value is not more than a difference between that ratio and ratios of the first case before and after that ratio, and determines that there is a decrease in the capability of the paper feed rollers 16 and 22 when the ratio of the second case, found from every predetermined number of times, is on the increase, and when the predetermined value is not more than a difference between that ratio and ratios of the second case before and after that ratio.

The color printer 1 includes the display 62. On determining that there is a decrease in the capability of the separation rollers 17 and 23 or the separation pads 18 and 24, the CPU 74 causes the display 62 to display information to the effect that there is a decrease in the capability of the separation rollers 17 and 23 or the separation pads 18 and 24, whereas on determining that there is a decrease in the capability of the paper feed rollers 16 and 22, the CPU 74 causes the display 62 to display information to the effect that there is a decrease in the capability of the paper feed rollers 16 and 22.

The color printer 1 includes the transmission unit 65. The CPU 74 sends the information of a decrease in the capability of the separation rollers 17 and 23 or the separation pads 18 and 24 to the outside via the transmission unit 65, and also sends the information of a decrease in the capability of the paper feed rollers 16 and 22 to the outside via the transmission unit 65.

By sending the determination result to the display unit 62 of the color printer 1, and/or to the outside of the color printer 1, for example, information terminals such as PCs and the like, it is possible for users or servicemen repairing the color printer 1 to recognize the conditions of the color printer 1.

The color printer 1 has the conveyance unit 200, the paper discharge tray 27 to which the sheets S are discharged, and the image forming unit 100 forming images. The conveyance unit 200 is provided on a conveyance path guiding the sheets S separated by the separation rollers 17 and 23 and the separation pads 18 and 24 to the paper discharge tray 27 through an image formation position of the image forming unit 100.

<Modifications>

While the embodiment of the present teaching is explained above, it is also possible to embody the present teaching in other forms.

For example, the difference time Td is defined in the above embodiment as the time from turning on the electromagnetic clutch control signal to the sheet sensor 63 detecting a sheet S. In reality, however, there is a response lag time from turning on the electromagnetic clutch control signal to the sheet sensor 63 starting rotation. This response lag time is resulted from, for example, the time for exciting the electromagnetic clutch 202, the backlash of the intermediate gear 203, and the like. Therefore, by measuring beforehand the response lag time from turning on the electromagnetic clutch control signal to the sheet sensor 63 starting to move, and letting the NVRAM 75 to store the same, it is also possible to use, for the determination, a time Td' calculated by subtracting the response lag time from the difference time Td.

Further, by adding a rotary sensor to the paper feed roller 16, it is also possible to let the rotary sensor to start measuring the difference time Td' from the point of time of the rotary sensor detecting the start-up of the paper feed roller 16.

In the above embodiment, one unit is defined as forming images on 1000 sheets S (to carry out the position estimation process 1000 times), and the data of three units of the position estimation process are used to determine the paper feed capability and the separation capability. However, it is not necessary to use the data of three units of the position estimation process for determining the paper feed capability and the separation capability. For example, it is also possible to carry out the capability determinations either using the data of one unit of the position estimation process or using the data of five units or the like with at least two units of the position estimation process.

Further, it is not necessary to limit the one unit to forming images on 1000 sheets S, but may either be defined as forming images on 1001 sheets S or more or be defined as forming images on 999 sheets S or less.

In the above embodiment, as one example of the separating unit, such a configuration is taken as to separate the sheets S with the separation roller 17 and the separation pad 18. However, it is also possible to adopt a configuration of separating the sheets S with a pair of separation rollers.

In the above embodiment, the determination results are displayed on the display 62.

However, it is also possible to send the fact of a decrease in the separating unit from the determination process to external information processing terminals via the transmission unit 65, or to send the fact of a decrease in the feeding unit from the determination process to the outside via the transmission unit 65.

In the above embodiment, the explanation is made on the case of the CPU 74 carrying out each process. However, the ASIC 71 may include a plurality of CPUs to let the plurality of CPUs cooperate in carrying out each process.

In the above embodiment, as one example of the image forming apparatus, the color printer 1 is taken with the image forming unit 100 having a print function. However, the image forming apparatus may be a multifunction printer having a print function and an image reading function.

In addition, it is possible to apply various design changes to the configuration mentioned above within the scope of the matters set forth in the appended claims.

What is claimed is:

1. A sheet conveyance apparatus configured to convey sheets, comprising:
    a loader unit configured to accommodate the sheets thereon in a state that the sheets are stacked in a thickness direction of the sheets;
    a feeding unit configured to contact with a sheet among the sheets located on the loader unit to feed the sheet from the loader unit;
    a separating unit provided on a downstream side of the feeding unit in a conveyance direction of the sheet to separate and convey one by one the sheets fed by the feeding unit;
    a detecting unit provided on the downstream side of the separating unit in the conveyance direction to detect the sheet; and
    a controller configured to:
        measure a difference time comprising an elapsed time between a first time at which an instruction to execute a sheet feeding operation is provided and a second time at which the sheet is detected by the detecting unit,
        acquire a number of occurrences corresponding to each of a first case that the difference time is shorter than a lower limit time and a second case that the difference time is longer than an upper limit time, every time the feeding unit is instructed to execute the operation for feeding the sheet;
        determine that there is a decrease in the separation capability of the separating unit in a case that a ratio of the number of the occurrences corresponding to the first case to a number of occurrences of instructing the feeding unit for operation of feeding the sheet is greater than a predetermined value; and
        determine that there is a decrease in the feed capability of the feeding unit in a case that a ratio of the number of occurrences corresponding to the second case to a number of occurrences of instructing the feeding unit for operation of feeding the sheet is greater than the predetermined value.

2. The sheet conveyance apparatus according to claim 1, wherein the controller is configured to take, as the difference time, a time calculated by subtracting a start-up requiring time from the elapsed time between the first time and the second time, the start-up requiring time being a time needed since the controller has instructed the feeding unit to execute the operation for feeding the sheet until the feeding unit starts the feeding.

3. The sheet conveyance apparatus according to claim 1, further comprising a storage unit,
    wherein the storage unit is configured to store the lower limit time and the upper limit time, wherein the lower limit time is defined by adding a start-up requiring time needed since the controller has instructed the feeding unit to execute the operation for feeding the sheet until the feeding unit starts the feeding and a time needed to convey the sheet from a position for the separating unit to separate the sheets to the position of the detecting unit; and wherein the upper limit time is defined by adding the start-up requiring time and a time needed to convey the sheet by the distance from a contact position between the feeding unit and the sheets to the position of the detecting unit.

4. The sheet conveyance apparatus according to claim 1, wherein the controller is further configured to:
    find a ratio of the number corresponding to the first case, acquired in the frequency acquirement during a predetermined number of occurrences with respect to the predetermined number of occurrences, and a ratio of the number corresponding to the second case, acquired in the frequency acquirement during the predetermined number of occurrences with respect to the predetermined number of occurrences, each time of reaching the predetermined number of occurrences of instructing the feeding unit for operation of feeding one of the sheets;
    determine whether or not there is a decrease in the separation capability of the separating unit by the ratio of the first case found each time from the predetermined number of occurrences; and
    determine whether or not there is a decrease in the capability of the feeding unit by the ratio of the second case found each time from the predetermined number of occurrences.

5. The sheet conveyance apparatus according to claim 4, wherein the controller is further configured to:
    determine that there is a decrease in the separation capability of the separating unit in a case that the ratio of the first case, found each time from the predetermined number of occurrences, is on the increase;
    determine that there is no decrease in the separation capability of the separating unit in a case that the ratio of the first case, found each time from the predetermined number of occurrences, is not on the increase;
    determine that there is a decrease in the feed capability of the feeding unit in a case that the ratio of the second case, found each time from the predetermined number of occurrences, is on the increase; and
    determine that there is no decrease in the feed capability of the feeding unit in a case that the ratio of the second case, found each time from the predetermined number of occurrences is not on the increase.

6. The sheet conveyance apparatus according to claim 5, wherein the controller is further configured to:
    determine that there is a decrease in the separation capability of the separating unit when the ratio of the first case, found each time from the predetermined number of occurrences, is on the increase, and in a case that a predetermined value is not more than a difference between the ratio and ratios of the first case before and after the ratio; and
    determine that there is a decrease in the feed capability of the feeding unit in a case that the ratio of the second case, found each time from the predetermined number of occurrences, is on the increase, and in a case that the predetermined value is not more than a difference between the ratio and ratios of the second case before and after the ratio.

7. The sheet conveyance apparatus according to claim 1, further comprising a display, wherein the controller is further configured to:
    cause the display to display information to the effect that there is a decrease in the separation capability of the separating unit when determining the decrease in the separation capability of the separating unit; and
    cause the display to display information to the effect that there is a decrease in the feed capability of the feeding unit when determining the decrease in the capability of the feeding unit.

8. The sheet conveyance apparatus according to claim 1, further comprising a transmission unit, wherein the controller is configured to:
   send a fact of a decrease in the separation capability of the separating unit via the transmission unit; and
   send a fact of a decrease in the feed capability of the feeding unit via the transmission unit.

9. An image forming apparatus comprising:
   the sheet conveyance apparatus according to claim 1;
   a paper discharge unit configured to place the sheets discharged; and
   an image forming unit configured to form images,
   wherein the sheet conveyance apparatus includes a conveyance unit provided on a conveyance path guiding the sheets separated by the separating unit to the paper discharge unit through an image formation position of the image forming unit.

10. A sheet conveyance apparatus configured to convey sheets, comprising:
   a loader unit configured to accommodate the sheets thereon in a state that the sheets are stacked in a thickness direction of the sheets;
   a feeding unit configured to contact with a sheet among the sheets located on the loader unit to feed the sheet from the loader unit;
   a separating unit provided on a downstream side of the feeding unit in a conveyance direction of the sheet to separate and convey one by one the sheets fed by the feeding unit;
   a detecting unit provided on the downstream side of the separating unit in the conveyance direction to detect the sheet;
   a transmission unit; and
   a controller configured to:
      measure a difference time comprising an elapsed time between a first time at which an instruction to execute a sheet feeding operation is provided and a second time at which the sheet is detected by the detecting unit,
      determine that there is a decrease in a separation capability of the separating unit in a case that the difference time is shorter than a lower limit time needed to convey the sheet from a position at which the separating unit separates the sheets to the position of the detecting unit;
      acquire a number of occurrences corresponding to each of a first case that the difference time is shorter than a lower limit time and a second case that the difference time is longer than an upper limit time, every time the feeding unit is instructed to execute the operation for feeding the sheet;
      send, via the transmission unit, a ratio of the number of occurrences corresponding to the first case to a number of times in which the feeding unit is instructed to execute the operation for feeding the sheet; and
      send, via the transmission unit, a ratio of the number of occurrences corresponding to the second case to the number of times in which the feeding unit is instructed execute the operation for feeding the sheet.

11. A sheet conveyance apparatus configured to convey sheets, comprising:
   a loader unit configured to accommodate the sheets thereon in a state that the sheets are stacked in a thickness direction of the sheets;
   a feeding unit configured to contact with a sheet among the sheets located on the loader unit to feed the sheet from the loader unit;
   a separating unit provided on a downstream side of the feeding unit in a conveyance direction of the sheet to separate and convey one by one the sheets fed by the feeding unit;
   a detecting unit provided on the downstream side of the separating unit in the conveyance direction to detect the sheet;
   a storage unit; and
   a controller configured to:
      measure a difference time comprising an elapsed time between a first time at which an instruction to execute a sheet feeding operation is provided and a second time at which the sheet is detected by the detecting unit, and
      based on the difference time being less than a predetermined lower limit time, determine that there is a decrease in a separation capability of the separating unit; and
      based on the difference time being greater than a predetermined upper limit time, determine that there is a decrease in a feed capability of the feeding unit,
   wherein the storage unit is configured to store the lower limit time and the upper limit time, wherein the lower limit time is defined by adding a start-up requiring time needed since the controller has instructed the feeding unit to execute the operation for feeding the sheet until the feeding unit starts the feeding and a time needed to convey the sheet from a position of the separating unit to separate the sheets to the position of the detecting unit, and wherein the upper limit time is defined by adding the start-up requiring time and a time needed to convey the sheet by the distance from a contact position between the feeding unit and the sheets to the position of the detecting unit.

* * * * *